US009444593B2

(12) United States Patent
Zheng

(10) Patent No.: US 9,444,593 B2
(45) Date of Patent: Sep. 13, 2016

(54) SYSTEMS AND METHODS FOR CODE SEQUENCE EXTENSION OVER TRANSMISSION IN WIRELESS COMMUNICATION ENVIRONMENTS

(71) Applicant: Acer Incorporated, Hsichih, Taipei (TW)

(72) Inventor: Yan-Xiu Zheng, Zhudong Township, Hsinchu County (TW)

(73) Assignee: ACER INCORPORATED, Hsichih, Taipei Hsien (TW)

( * ) Notice: Subject to any disclaimer, the term of this patent is extended or adjusted under 35 U.S.C. 154(b) by 199 days.

(21) Appl. No.: 13/935,849

(22) Filed: Jul. 5, 2013

(65) Prior Publication Data

US 2013/0294378 A1 Nov. 7, 2013

Related U.S. Application Data

(63) Continuation of application No. 12/817,424, filed on Jun. 17, 2010, now Pat. No. 8,520,753.

(60) Provisional application No. 61/218,685, filed on Jun. 19, 2009.

(51) Int. Cl.
*H04L 5/00* (2006.01)
*H04L 27/26* (2006.01)

(52) U.S. Cl.
CPC ......... *H04L 5/0044* (2013.01); *H04L 27/2613* (2013.01)

(58) Field of Classification Search
CPC ............. H04L 5/0044; H04L 27/2613; H04L 27/2647; H04L 5/0007; H04L 1/0618; H04W 72/0446
See application file for complete search history.

(56) References Cited

U.S. PATENT DOCUMENTS

| 6,542,556 B1* | 4/2003 | Kuchi ................. H04L 1/0618 370/204 |
| 7,266,157 B2 | 9/2007 | Sim et al. |
| 8,116,195 B2 | 2/2012 | Hou et al. |
| 8,149,782 B2* | 4/2012 | Noh ..................... H04L 5/0007 370/330 |
| 8,391,380 B2* | 3/2013 | Chun ................... H04L 1/0003 375/260 |

(Continued)

FOREIGN PATENT DOCUMENTS

CN 101341708 1/2009

OTHER PUBLICATIONS

European Search Report dated Nov. 12, 2012.

(Continued)

*Primary Examiner* — Andrew Lai
*Assistant Examiner* — Chuong M Nguyen
(74) *Attorney, Agent, or Firm* — McClure, Qualey & Rodack, LLP

(57) ABSTRACT

A transmitter for transmitting signals to a receiver is provided. The transmitter generates a padded code sequence including a plurality of symbols with the last symbol being a duplication of the first symbol, and transmit the padded code sequence with the symbols therein respectively corresponding to a plurality of first sub-carriers to the receiver via an air interface using a first antenna in a time period. Also, the transmitter duplicates the padded code sequence and transmits the duplicated padded code sequence with the symbols therein respectively corresponding to a plurality of second sub-carriers to the receiver via the air interface using a second antenna in the time period.

76 Claims, 14 Drawing Sheets

(56) References Cited

U.S. PATENT DOCUMENTS

| | | | |
|---|---|---|---|
| 2005/0152314 A1 | 7/2005 | Sun et al. | |
| 2007/0183307 A1 | 8/2007 | Akita et al. | |
| 2008/0101499 A1 | 5/2008 | Fung et al. | |
| 2008/0107086 A1 | 5/2008 | Fukuta et al. | |
| 2009/0268602 A1* | 10/2009 | Han | H04J 11/0069 370/208 |
| 2009/0268831 A1 | 10/2009 | Onggosanusi et al. | |
| 2011/0019694 A1* | 1/2011 | Kwon | H04L 27/2613 370/474 |

OTHER PUBLICATIONS

Popovic, B.; "Generalized Chirp-Like Polyphase Sequences with Optimum Correlation Properties;" IEEE Transactions on Information Theory, vol. 38, No. 4, Jul. 1992; pp. 1406-1409.

Chennakeshu, S., et al.; "Differential Detection of /4-Shifted-DQPSK for Digital Cellular Radio;" IEEE Transactions on Vechnology, vol. 42, No. 1, Feb. 1993; pp. 46-57.

van Schyndel, R.G., et al; "Algebraic Construction of a New Class of Quasi-Orthogonal Arrays in Steganography;" SPIE Electronic Imaging, vol. 3657, 1999; pp. 11.

Kebo, A., et al; Ambiguity and Sidelobe Behavior of CAZAC Coded Waveforms; IEEE Rader Conference, Boston, Apr. 17-20, 2007; pp. 5.

Luo, X., et al.; "Transmit Diversity Scheme over Single SC-FDM Symbol for LTE-Advanced;"Conference in Globecomm 2009, from Nov. 30 to Dec. 4 2009 in Honolulu, Hawaii; pp. 1-5.

Chinese language office action dated May 6, 2013.

* cited by examiner

SYSTEMS AND METHODS FOR CODE SEQUENCE EXTENSION OVER TRANSMISSION IN WIRELESS COMMUNICATION ENVIRONMENTS

CROSS REFERENCE TO RELATED APPLICATIONS

This application is a Continuation of pending U.S. patent application Ser. No. 12/817,424, filed on Jun. 17, 2010 and entitled "Systems and Methods for CODE Sequence Extension over Transmission in Wireless Communication Environments", which claims the benefit of U.S. Provisional Application No. 61/218,685, filed on Jun. 19, 2009, the entirety of which is incorporated by reference herein.

BACKGROUND OF THE INVENTION

1. Field of the Invention

The invention generally relates to wireless communication technologies, and more particularly, to code sequence generation systems and methods for providing a padded code sequence.

2. Description of the Related Art

For a wireless communication environment utilizing Orthogonal Frequency-Division Multiplexing (OFDM) technology. Transmission data is carried in a plurality of orthogonal sub-carriers. For example, the transmission data is divided into multiple groups and each group is mapped into one modulation symbol, and these modulation symbols are further placed on these sub-carriers. Subsequently, transmitter performs Fast Fourier Transform (FFT) and produces time-domain samples, and then the transmitter performs digital to analog (D/A) conversion and generates time-domain continuous waveform. Then the transmitter performs up-conversion on the produced time-domain waveform to a carrier. Single carrier OFDM (SC-OFDM) is a similar technology to the OFDM. The transmitter performs FFT on the modulation symbols, and allocates the transformed samples on frequency domain. Transmitter continues with performing inversed FFT (IFFT), and then performing the D/A conversion and up-covert to a carrier. The OFDM technology is widely adopted in a large number of wireless communication standards, such as IEEE 802.11a/g, the Ultra-WideBand (UWB), the Worldwide Interoperability for Microwave Access (WiMAX), 3GPP Long Term Evolution (LTE), etc. SC-OFDM is applied in the uplink for the 3GPP LTE.

Zadoff-Chu code features low peak to average power ratio, zero cross-correlation, low complexity receiver, etc. The LTE has adopted this code in synchronization channel, uplink control channel, etc. There are some other codes with similar features such as generalized chirp-like code, CAZAC sequence. Within a set of Zadoff-Chu code, the codes are orthogonal and provide excellent detection probability if match detection is used. However, when the differential detection is applied, this code is not optimal.

BRIEF SUMMARY OF THE INVENTION

Accordingly, embodiments of the invention provide systems and methods for code sequence extension over transmission in wireless communication environments. In one aspect of the invention, a transmitter for transmitting signals to a receiver is provided. The transmitter generates a padded code sequence comprising a plurality of symbols with the last symbol being a duplication of the first symbol, and transmits the padded code sequence with the symbols therein respectively corresponding to a plurality of first sub-carriers to the receiver via an air interface using a first antenna in a time period. Also, the transmitter duplicates the padded code sequence and transmits the duplicated padded code sequence with the symbols therein respectively corresponding to a plurality of second sub-carriers to the receiver via the air interface using a second antenna in the time period.

In another aspect of the invention, an OFDM transmitter for transmitting signals to a receiver is provided. The OFDM transmitter generates a padded Zadoff-Chu code sequence comprising a plurality of symbols for a ranging preamble code with the last symbol being a duplication of the first symbol, and transmits the padded Zadoff-Chu code sequence to a receiver via an air interface. The transmitted code sequence can be used for ranging preamble code or synchronization channel.

In another aspect of the invention, a transmission method for a wireless communication device is provided. The transmission method comprises the steps of generating a padded code sequence comprising a plurality of symbols with the last symbol being a duplication of the first symbol, transmitting the padded code sequence with the symbols therein respectively corresponding to a plurality of first sub-carriers to a receiver via an air interface using a first antenna in a time period, and duplicating the padded code sequence and transmitting the duplicated and padded code sequence with the symbols therein respectively corresponding to a plurality of second sub-carriers to the receiver via the air interface using a second antenna in the time period.

In another aspect of the invention, a transmission method for an OFDM wireless communication device is provided. The transmission method comprises the steps of generating a padded Zadoff-Chu code sequence comprising a plurality of symbols for a ranging preamble code with the last symbol being a duplication of the first symbol, and transmitting the padded Zadoff-Chu code sequence to a receiver via an air interface.

In another aspect of the invention, a non-transitory machine-readable storage medium is provided. The non-transitory machine-readable storage medium comprises a computer program which, when executed, causes a wireless communication device to perform a transmission method. The transmission method comprises the steps of generating a padded code sequence comprising a plurality of symbols with the last symbol being a duplication of the first symbol, transmitting the padded code sequence with the symbols therein respectively corresponding to a plurality of first sub-carriers to a receiver via an air interface using a first antenna in a time period, and duplicating the padded code sequence and transmitting the duplicated and padded code sequence with the symbols therein respectively corresponding to a plurality of second sub-carriers to the receiver via the air interface using a second antenna in the time period.

In another aspect of the invention, a non-transitory machine-readable storage medium is provided. The non-transitory machine-readable storage medium comprises a computer program which, when executed, causes an OFDM wireless communication device to perform a transmission method. The transmission method comprises the steps of generating a padded Zadoff-Chu code sequence comprising a plurality of symbols for a ranging preamble code with the last symbol being a duplication of the first symbol, and transmitting the padded Zadoff-Chu code sequence to a receiver via an air interface.

Other aspects and features of the invention will become apparent to those with ordinary skill in the art upon review of the following descriptions of specific embodiments of the transmitter, the OFDM transmitter, the transmission methods, and the machine-readable storage mediums for code sequence extension over transmission in wireless communication environments.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
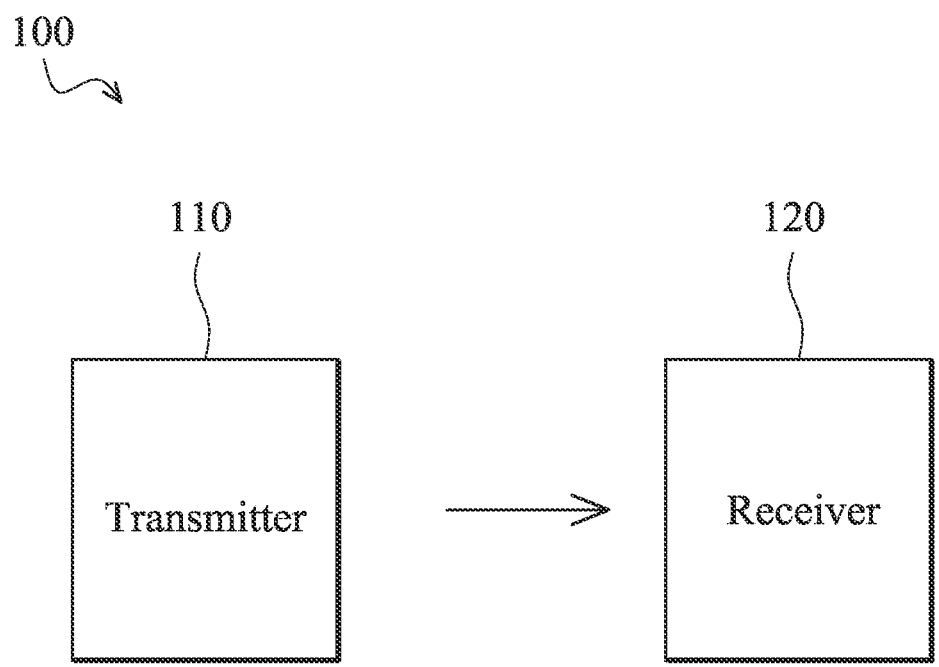
FIG. 1 is a block diagram illustrating a wireless communication system according to an embodiment of the invention.

The proposed method proposed a padding method to Zadoff-Chu code sequence to enhance the code property. After the padding, the Zadoff-Chu code sequence may obtain extra code property, and this code property provides zero cross-correlation after differential operation. FIG. 1 is a block diagram illustrating a wireless communication system according to an embodiment of the invention. In the wireless communication system 100, a transmitter 110 and a receiver 120 are provided for wireless communications therebetween via the air interface. The transmitter 110 generates a padded code sequence comprising a plurality of symbols with the last symbol being a duplication of the first symbol, to maintain orthogonality of the code sequence in the differential domain. Subsequently, the transmitter 110 transmits the padded code sequence to the receiver 120 via the air interface. Upon receiving the padded code sequence via the air interface, the receiver 120 may perform differential detection to detect the padded code sequence. Note that the transmission between the transmitter 110 and the receiver 120 may utilize the OFDM technology or the Single Carrier-OFDM (SC-OFDM) technology, and the code sequence may be a Zadoff-Chu code sequence, a Generalized Chirp-Like (GCL) code sequence, or a Constant Amplitude Zero AutoCorrelation (CAZAC) code sequence. In order to give clear examples, the following embodiments use Zadoff-Chu code sequences for detailed descriptions, but the invention is not limited thereto.

Figure 2A:
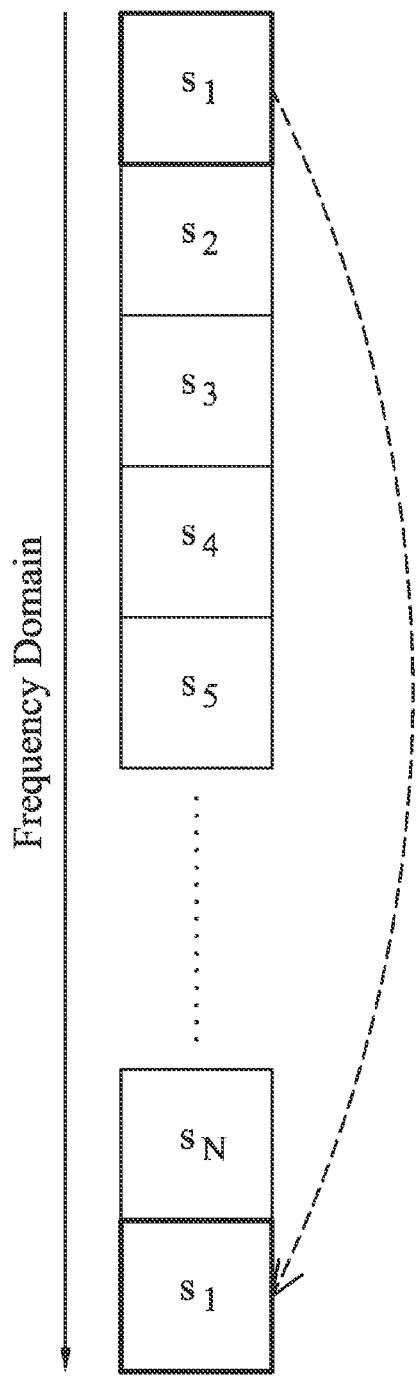
FIGS. 2A to 2C are block diagrams illustrating padded Zadoff-Chu code sequences on frequency domain according to an embodiment of the invention.
Figure 2B:
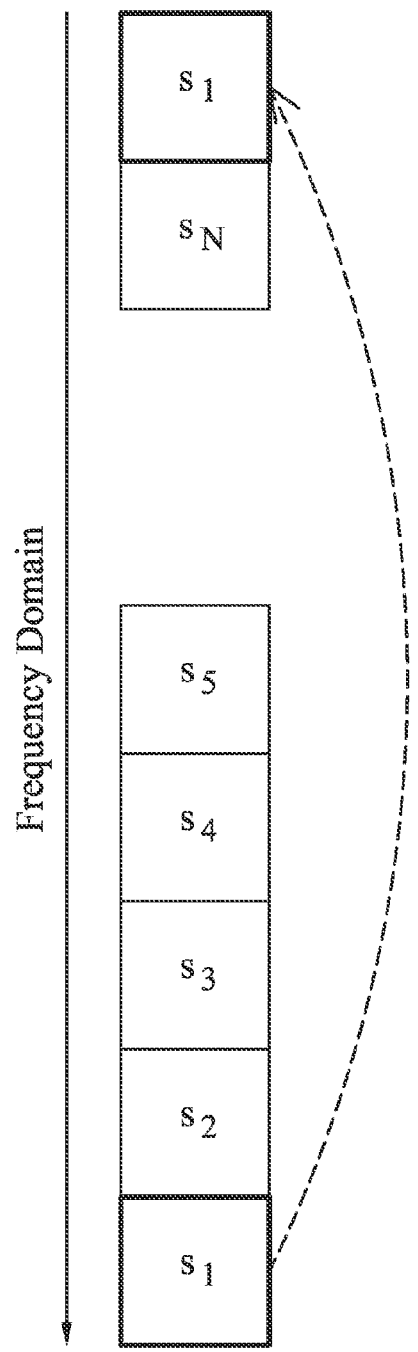
Figure 2C:
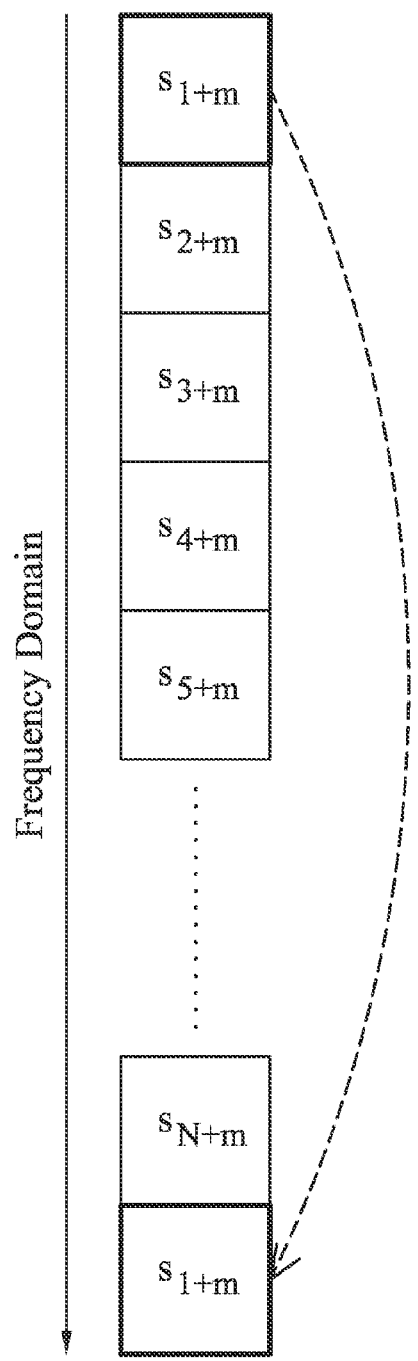

FIGS. 2A to 2C are block diagrams illustrating padded Zadoff-Chu code sequences on frequency domain according to an embodiment of the invention. In this embodiment, the original codeword to be transmitted is a Zadoff-Chu code sequence comprising a plurality of symbols denoted as $s_1$ to $s_N$. The transmitter 110 duplicates the first symbol $s_1$ and cyclically pads the duplicated symbol to the end of the Zadoff-Chu code sequence. Specifically, each symbol of the padded Zadoff-Chu code sequence is carried on a sub-carrier corresponding to a respective radio frequency selected in an increasing order on the frequency domain, as shown in FIG. 2A; while in other embodiments, the corresponding radio frequencies may be selected in a decreasing order on the frequency domain, as shown in FIG. 2B. In other embodiments, the symbols of the padded Zadoff-Chu code sequence may be allocated in a circular shift order. That is, the padded Zadoff-Chu code sequence may be placed, starting with the (m+1)-th symbol to the N-th symbol and continuing with the first symbol to the m-th symbol, as shown in FIG. 2C, wherein m may be any number larger than zero and not greater than N. In this figure, $s_m$ equals to $s_{1+(m\ mod\ N)}$ if m is larger than N, wherein (m mod N) means the remainder of m divided by N.

Figure 3:
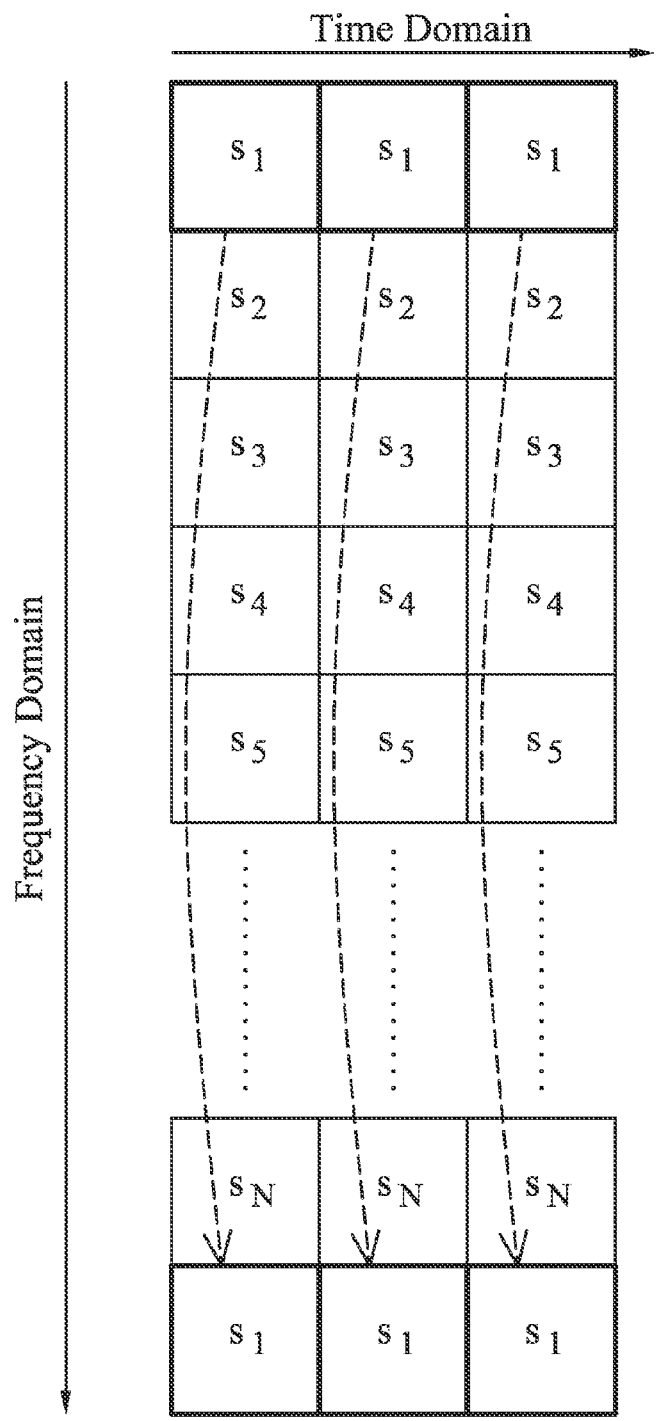
FIG. 3 is a block diagram illustrating duplications of a padded Zadoff-Chu code sequence on time domain according to an embodiment of the invention.

FIG. 3 is a block diagram illustrating duplications of a padded Zadoff-Chu code sequence on time domain according to an embodiment of the invention. Similar to the embodiment of FIG. 2A to 2C, the original codeword to be transmitted is a Zadoff-Chu code sequence comprising a plurality of symbols denoted as $s_1$ to $s_N$, and the first symbol $s_1$ is duplicated and cyclically padded to the end of the Zadoff-Chu code sequence. However, the padded Zadoff-Chu code sequence is transmitted not only during the time period $T_1$, but also during the time periods $T_2$ and $T_3$, wherein the time periods $T_1$ to $T_3$ are continuously located in an increasing order in the time domain. That is, the transmitter 110 further duplicates the padded Zadoff-Chu code sequence twice and transmits the duplicated and padded Zadoff-Chu code sequences during the time period $T_2$ and $T_3$, respectively. Specifically, each symbol of the two duplicated and padded Zadoff-Chu code sequences may be allocated on the same sub-carrier as the corresponding symbol of the padded Zadoff-Chu code sequence. In other embodiments, the number of duplications may be configured to be any number other than two.

Figure 4:
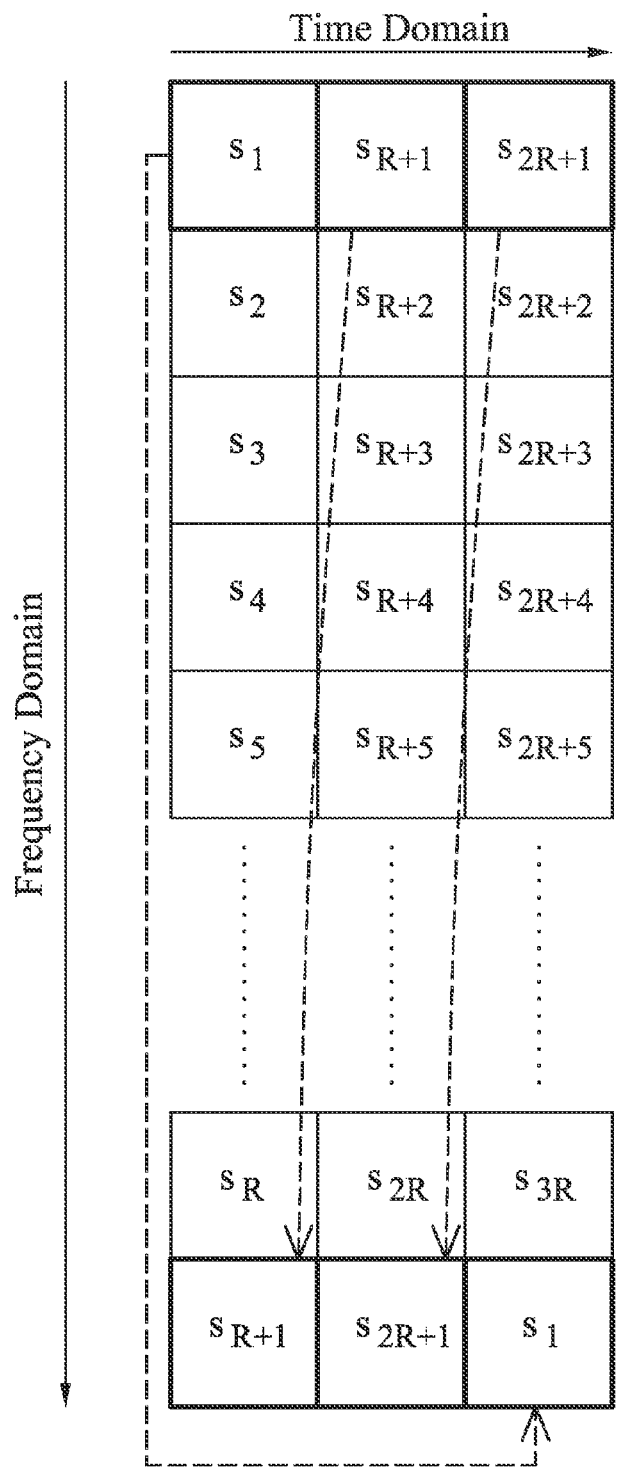
FIG. 4 is a block diagram illustrating a padded Zadoff-Chu code sequence on both frequency and time domains according to an embodiment of the invention.

FIG. 4 is a block diagram illustrating a padded Zadoff-Chu code sequence on both frequency and time domains according to an embodiment of the invention. In this embodiment, the original codeword to be transmitted is a Zadoff-Chu code sequence comprising a plurality of symbols denoted as $s_1$ to $s_{3R}$. 3R may be specified in advance. Transmitter 110 and receiver 120 know the number 3R. In other embodiment, the receiver 120 may negotiate with the transmitter 110 to acquire the number 3R. In other embodiment, the receiver 120 may read broadcasting channel to acquire the number. The transmitter 110 subsequently divides the Zadoff-Chu code sequence into 3 sections according to the transmission length R. That is, the first section comprises R symbols denoted as $s_1$ to $s_R$, the second section comprises R symbols denoted as $s_{R+1}$ to $s_{2R}$, and the third section comprises R symbols denoted as $s_{2R+1}$ to $s_{3R}$. Each symbol of one of the sections may be allocated on a respective sub-carrier corresponding to a respective radio frequency selected in an increasing order from the frequency domain, and each section is transmitted in a respective time period continuously selected from the time domain, as shown in FIG. 4. These sections may be aligned in the time domain such that the symbols in the same position of the sections are corresponding to the same sub-carriers. After the Zadoff-Chu code sequence is divided and placed in the described order, the transmitter 110 further duplicates and cyclically pads the first symbol of the second section, i.e. the symbol $S_{R+1}$, to the end of the first section, the first symbol of the third section, i.e. the symbol $s_{2R+1}$, to the end of the second section, and the first symbol of the first section, i.e. the symbol $s_1$, to the end of the third section. In other embodiments, the radio frequencies corresponding to the symbols may be selected in a decreasing order from the frequency domain. Note that the symbol $s_1$ is padded after the last symbol of Zadoff-Chu code sequence in the last section. If the length of the Zadoff-Chu code sequence is less than 3R, the transmitter 110 may leave the slots corresponding to the residual sub-carriers in the third section empty or assign zero to the slots corresponding to the residual sub-carriers in the third section, after the duplications and cyclical padding are done.

Figure 5:
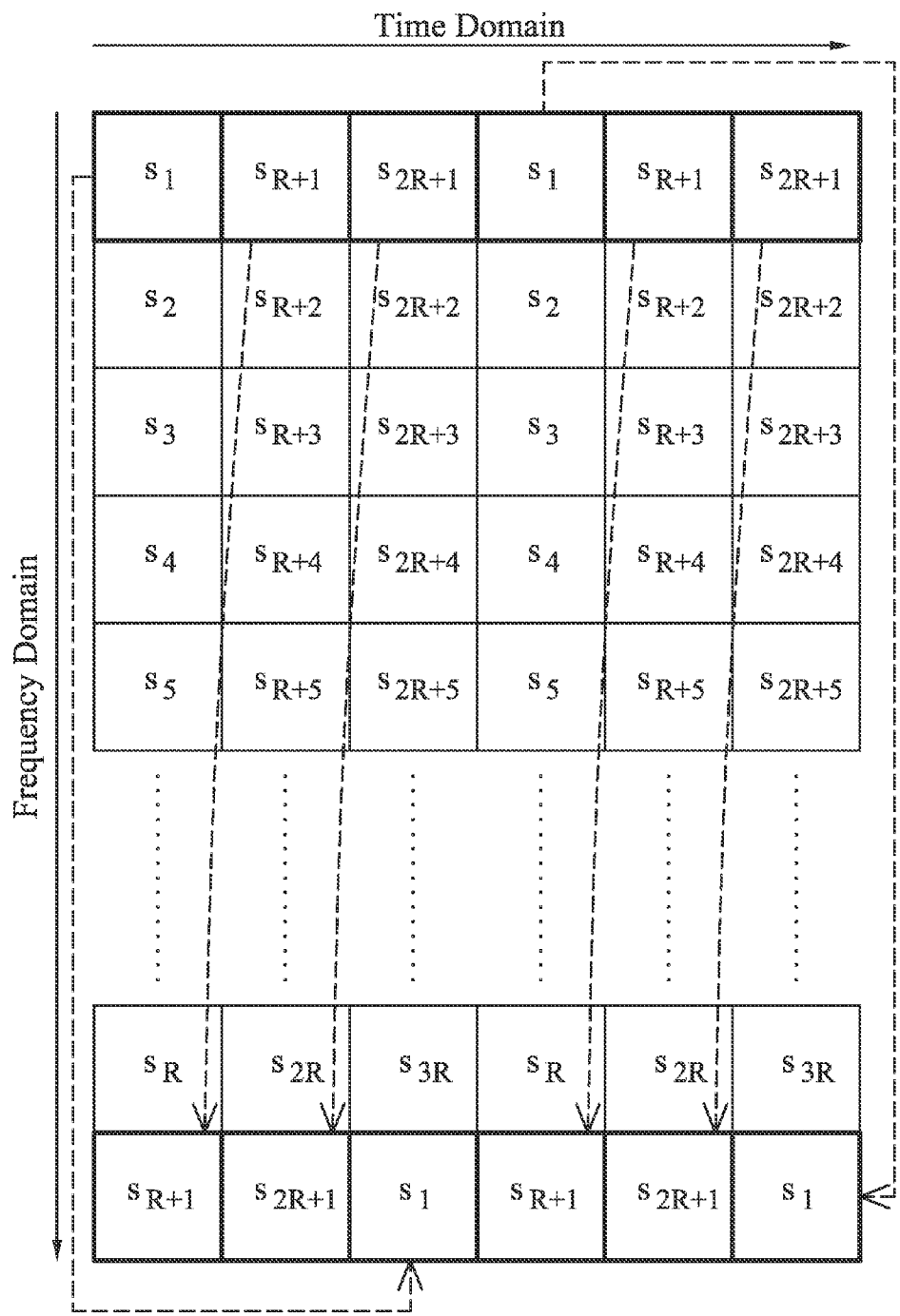
FIG. 5 is a block diagram illustrating duplications of a padded Zadoff-Chu code sequence on time domain according to an embodiment of the invention.

FIG. 5 is a block diagram illustrating duplications of a padded Zadoff-Chu code sequence on time domain according to an embodiment of the invention. Similar to the embodiment of FIG. 4, the original codeword to be transmitted is a Zadoff-Chu code sequence comprising a plurality of symbols denoted as $s_1$ to $s_{3R}$, and the Zadoff-Chu code sequence is divided into sections and cyclically padded among the sections. However, the transmitter 110 further duplicates the cyclically padded Zadoff-Chu code sequence, and transmits the duplication of the cyclically padded Zadoff-Chu code sequence in the subsequent OFDM symbols, as shown in FIG. 5. Likewise, in the duplication of the padded Zadoff-Chu code sequence, the sections are aligned in the time domain such that the symbols in the same position of the sections are corresponding to the same radio frequency, and the symbol $s_1$ is padded after the last symbol of Zadoff-Chu code sequence in the last section. If the length of the Zadoff-Chu code sequence is less than 3R, the transmitter 110 may further leave the slots corresponding to the residual sub-carriers in the third section empty or assign zero to the slots corresponding to the residual sub-carriers in the third section.

It is noted that the embodiments of FIGS. 2A to 2B and FIGS. 3 to 5 may be applied in the ranging channel or random access channel in the OFDM or SC-OFDM system.

Figure 6:
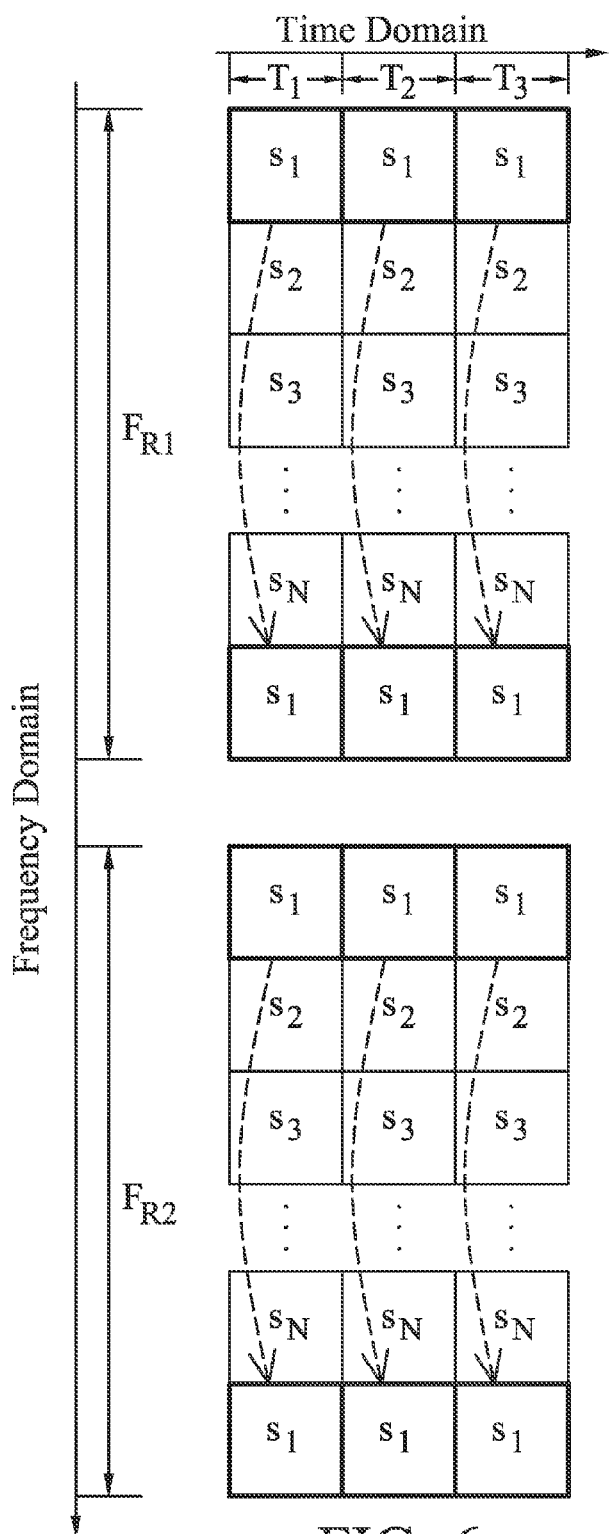
FIG. 6 is a block diagram illustrating duplications of padded Zadoff-Chu code sequences with distributed structure on frequency domain according to an embodiment of the invention.

The padded Zadoff-Chu code sequence may by further duplicated in the frequency domain in the distributed structure. FIG. 6 is a block diagram illustrating duplications of padded Zadoff-Chu code sequences with distributed structure on frequency domain according to an embodiment of the invention. For a Zadoff-Chu code sequence padded and duplicated as described in the embodiment of FIG. 3, the padded Zadoff-Chu code sequence and the duplications of the padded Zadoff-Chu code sequence may be taken as a transmission block for simplicity, wherein the symbols in each padded Zadoff-Chu code sequence of the transmission block are allocated on sub-carriers in an increasing order corresponding to the radio frequency range $F_{R1}$. The transmitter 110 may further duplicate the transmission block, and transmit the duplicated transmission block in the radio frequency range $F_{R2}$. Specifically, the symbols in each padded Zadoff-Chu code sequence of the duplicated transmission block are allocated on sub-carriers in an increasing order corresponding to the radio frequency range $F_{R2}$. In addition, the padded Zadoff-Chu code sequences in each transmission block are transmitted in three subsequent time periods, i.e., the first padded Zadoff-Chu code sequences of the transmission blocks are transmitted during the time period $T_1$, the second padded Zadoff-Chu code sequences of the transmission blocks are transmitted during the time period $T_2$, and the third padded Zadoff-Chu code sequences of the transmission blocks are transmitted during the time period $T_3$.

It is noted that the distributed structure may be applied to ranging code or random access channel in an OFDM or SC-OFDM system.

Figure 7:
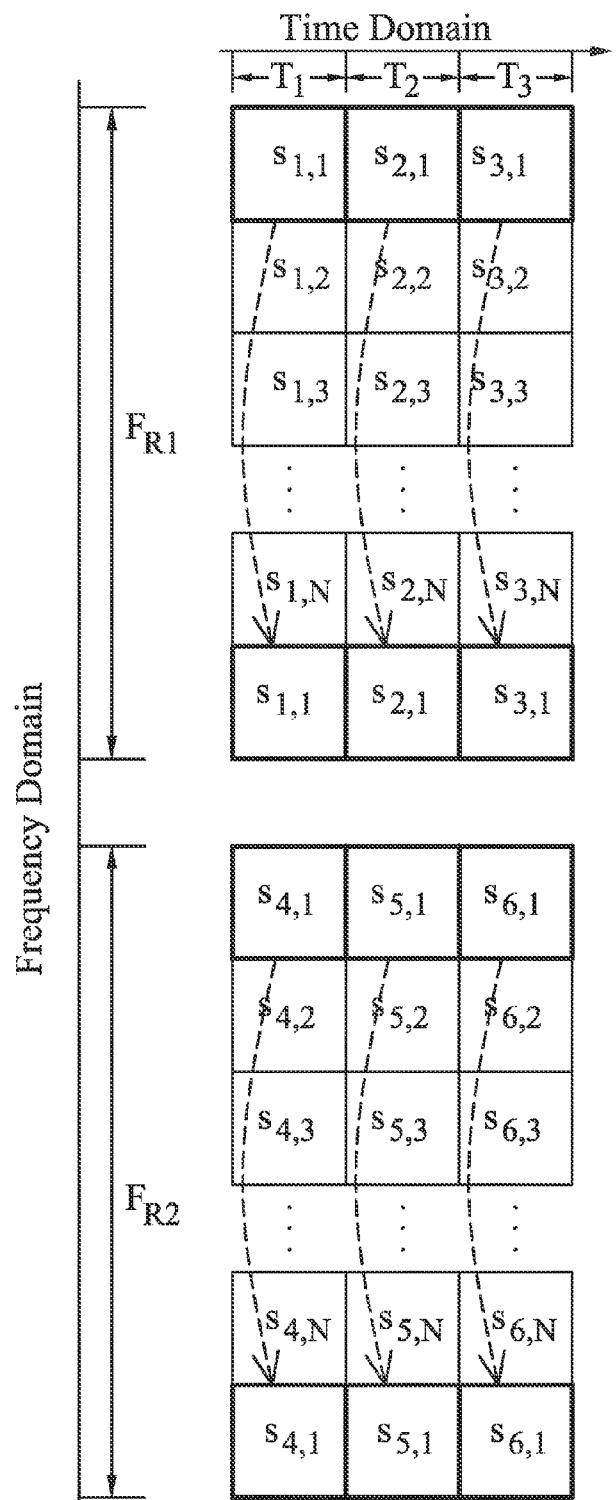
FIG. 7 is a block diagram illustrating multiple padded Zadoff-Chu code sequences with distributed structure according on frequency domain to an embodiment of the invention.

FIG. 7 is a block diagram illustrating multiple padded Zadoff-Chu code sequences with distributed structure on frequency domain according to an embodiment of the invention. For the transmissions of multiple Zadoff-Chu code sequences, all the Zadoff-Chu code sequences may be padded as described in the embodiment of FIG. 2A, except that the placements of the padded Zadoff-Chu code sequences are on both of the frequency and time domains. That is, the first Zadoff-Chu code sequence, comprising N symbols denoted as $s_{1,1}$ to $s_{1,N}$, is padded with $s_{1,1}$, the second Zadoff-Chu code sequence, comprising N symbols denoted as $s_{2,1}$ to $s_{2,N}$, is padded with $s_{2,1}$, and the third Zadoff-Chu code sequence, comprising N symbols denoted as $s_{3,1}$ to $s_{3,N}$, is padded with $s_{3,1}$, etc. For simplicity, every three padded Zadoff-Chu code sequences may be taken as a transmission block, i.e., the first transmission block comprises the padded first, second, and third Zadoff-Chu code sequences, and the second transmission block comprises the padded fourth, fifth, and sixth Zadoff-Chu code sequences. Specifically, the symbols in each padded Zadoff-Chu code sequence of the first transmission block are allocated on sub-carriers in an increasing order corresponding to the radio frequency range $F_{R1}$, and the symbols in each padded Zadoff-Chu code sequence of the second transmission block are allocated on sub-carriers in an increasing order corresponding to the radio frequency range $F_{R2}$. In addition, the padded Zadoff-Chu code sequences in each transmission block are transmitted in three subsequent time periods, i.e., the padded first and fourth Zadoff-Chu code sequences are transmitted during the time period $T_1$, the padded second and fifth Zadoff-Chu code sequences are transmitted during the time period $T_2$, and the padded third and sixth Zadoff-Chu code sequences are transmitted during the time period $T_3$.

It is noted that the distributed structure may be applied to ranging code or random access channel in an OFDM or SC-OFDM system.

Figure 8:
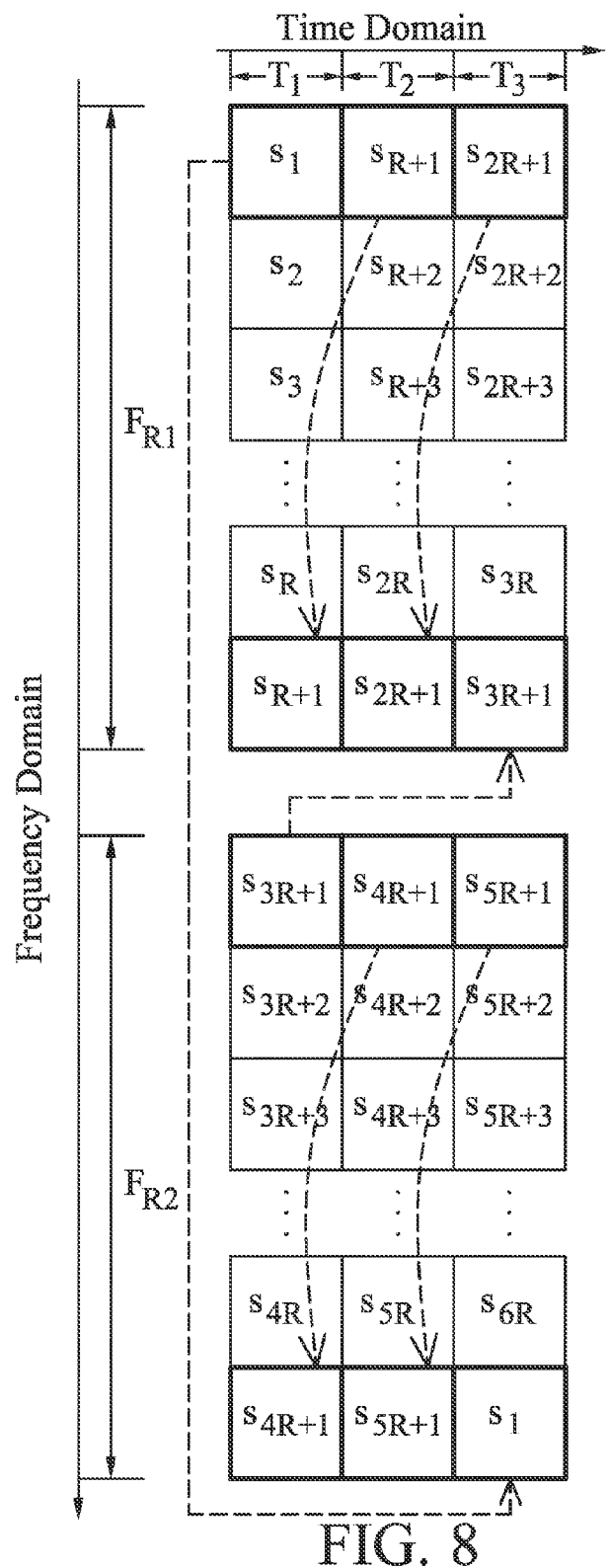
FIG. 8 is a block diagram illustrating a padded Zadoff-Chu code sequence with distributed structure on frequency domain according to an embodiment of the invention.

FIG. 8 is a block diagram illustrating a padded Zadoff-Chu code sequence with distributed structure on frequency domain according to an embodiment of the invention. In this embodiment, the length of the Zadoff-Chu code sequence is 6R and the Zadoff-Chu code sequence is divided into 6 sections with R symbols. Regarding the cyclical padding of symbols in these sections, references may be made to the embodiment of FIG. 4. To further clarify, the transmitter 110 duplicates and pads the first symbol of the second section, i.e. the symbol $s_{R+1}$ to the end of the first section, the first symbol of the third section, i.e. the symbol $s_{2R+1}$ to the end of the second section, the first symbol of the fourth section, i.e. the symbol $s_{3R+1}$ to the end of the third section. Likewise, the transmitter 110 duplicates and pads the first symbol of the fifth section, i.e. the symbol $s_{4R+1}$, to the end of the fourth section, the first symbol of the sixth section, i.e. the symbol $s_{5R+1}$, to the end of the fifth section, and lastly, cyclically duplicates and pads the first symbol of the first section, i.e. the symbol $s_1$, to the end of the sixth section. For simplicity, every three padded sections of the Zadoff-Chu code sequence may be taken as a transmission block, wherein the symbols in each padded section of the first transmission block are allocated on sub-carriers in an increasing order corresponding to the radio frequency range $F_{R1}$, and the symbols in each padded section of the second transmission block are allocated on sub-carriers in an increasing order corresponding to the radio frequency range $F_{R2}$. In addition, the padded sections of each transmission block are transmitted in three subsequent time periods, i.e., the first padded sections of the first and second transmission blocks are transmitted during the time period $T_1$, the second padded sections of the first and second transmission blocks are transmitted during the time period $T_2$, and the third padded sections of the first and second transmission blocks are transmitted during the time period $T_3$.

It is noted that the distributed structure may be applied to ranging code or random access channel in an OFDM or SC-OFDM system.

Figure 9A:
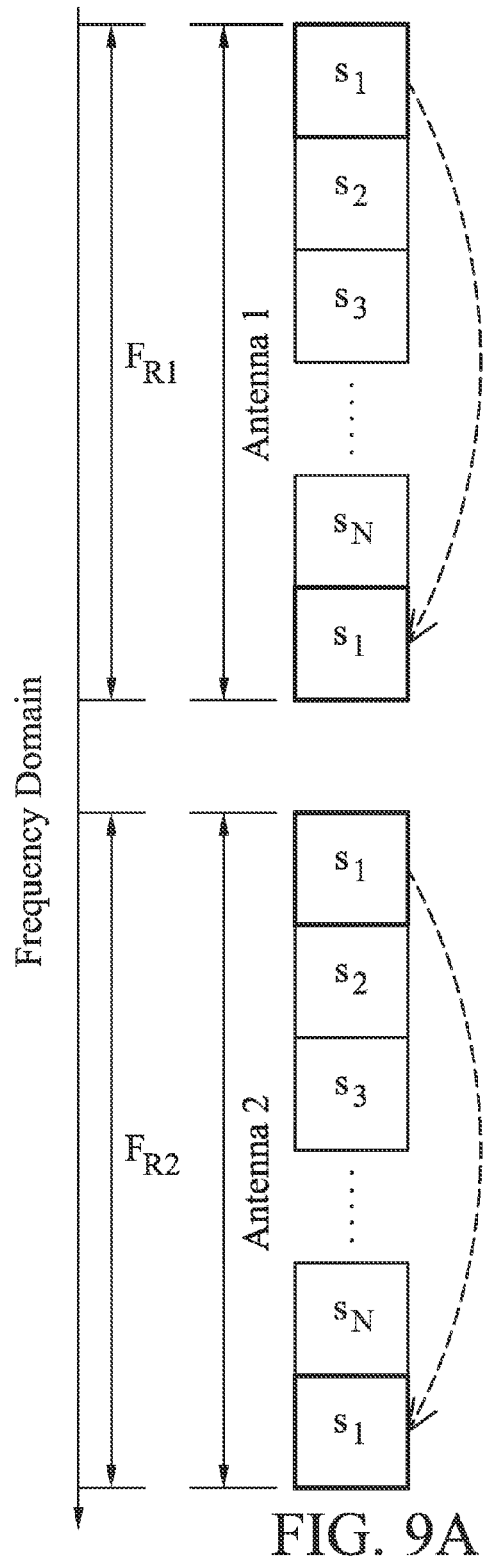
FIGS. 9A to 9B are block diagrams illustrating duplications of a padded Zadoff-Chu code sequence in relation to 2 antennas on the frequency domain according to an embodiment of the invention.
Figure 9B:
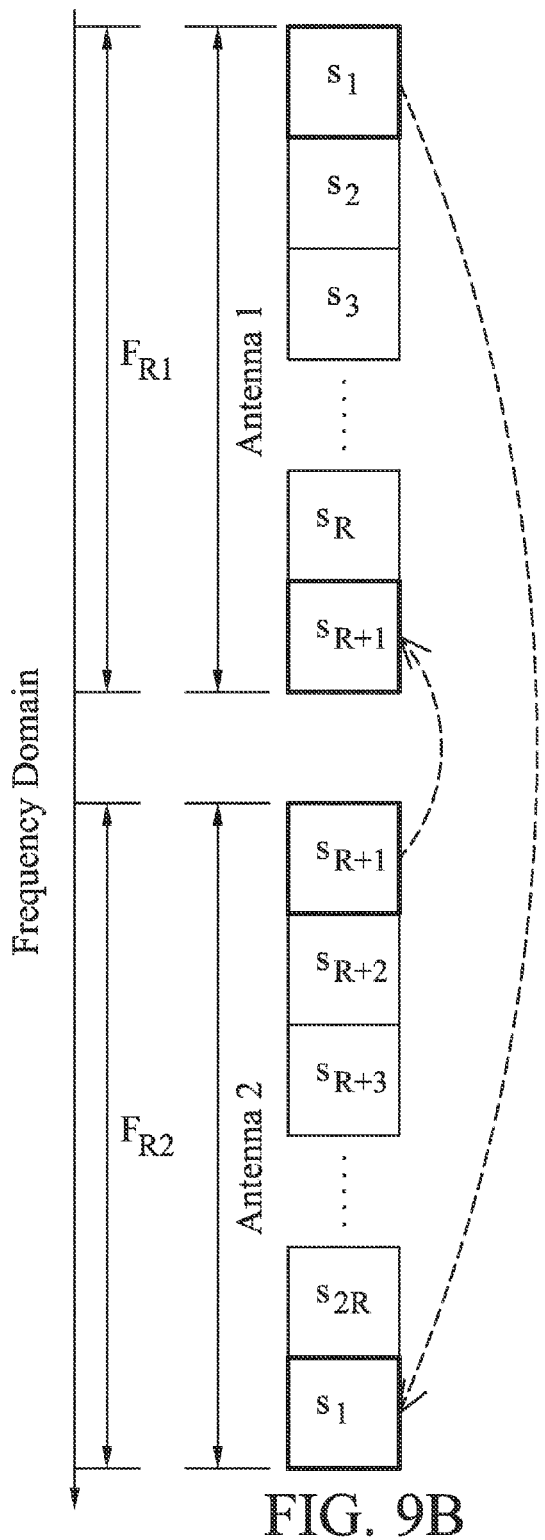

In addition to the ranging channel and random access channel, the embodiments of FIGS. 2A to 2B and FIGS. 3 to 5 may also be applied to the synchronization channel in the OFDM or SC-OFDM system. If the transmitter 110 has only one antenna (now shown) coupled therein for transmitting the code sequences, the embodiments of FIGS. 2A to 2B and FIGS. 3 to 5 may be applied to padding the code sequences as described above. Otherwise, if the transmitter 110 has multiple antennas (now shown) coupled therein for transmitting the code sequence, the transmitter 110 may further duplicate the padding of the code sequences on the frequency domain. FIGS. 9A to 9B are block diagrams illustrating duplications of a padded Zadoff-Chu code sequence in relation to 2 antennas on the frequency domain according to an embodiment of the invention. With multiple antennas, the transmitter 110 may transmit, in the same time period, code sequences in multiple radio frequency ranges. For example, the transmitter 110 may use a first antenna to transmit the padded Zadoff-Chu code sequence of FIG. 2A in the radio frequency range $F_{R1}$, and use a second antenna to transmit the duplication of the padded Zadoff-Chu code sequence in the radio frequency range $F_{R2}$, as shown in FIG. 9A. Alternatively, the transmitter 110 may use a first antenna to transmit the padded first section of the Zadoff-Chu code sequence of FIG. 4 in the radio frequency range $F_{R1}$, and use a second antenna to transmit the padded second section of the Zadoff-Chu code sequence of FIG. 4 in the radio frequency range $F_{R2}$, etc., as shown in FIG. 9B. In other embodiments, the number of antennas coupled in the transmitter 110 may be more than two.

Figure 10:
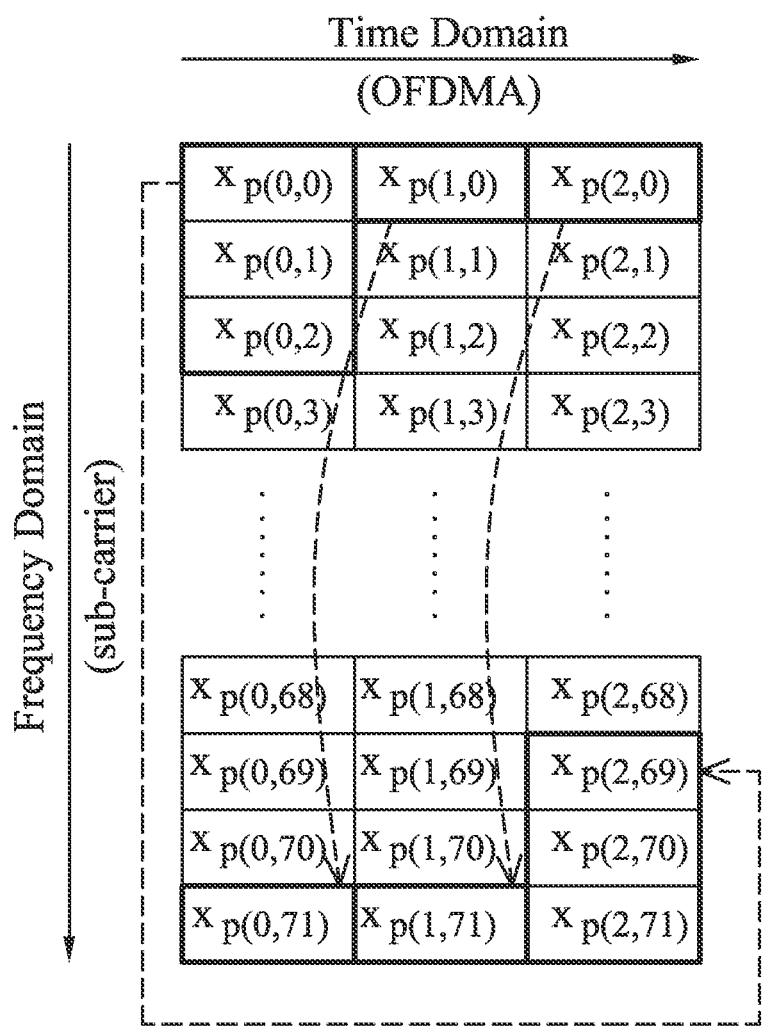
FIG. 10 is a block diagram illustrating a padded Zadoff-Chu code sequence with cyclical shifts for Ranging Preamble (RP) codes according to an embodiment of the invention.

FIG. 10 is a block diagram illustrating a padded Zadoff-Chu code sequence with cyclic shifts for Ranging Preamble (RP) codes according to an embodiment of the invention. The placement of the symbols in an RP code are given by the following equation:

$$x_p(n, k) = \exp\left(-j \cdot \pi\left(\frac{r_p \cdot (n \cdot 71 + k) \cdot (n \cdot 71 + k + 1)}{211} + \frac{2 \cdot k \cdot s_p \cdot N_{TCS}}{N_{FFT}}\right)\right),$$
where $k = 0, 1, \ldots, N_{RP} - 1; n = 0, 1, 2$ wherein $x_p(n, k)$ represents the p-th RP code for the n-th Orthogonal Frequency-Division Multiple Access (OFDMA) symbol, p is the index for the p-th RP code within a basic unit which is made as the $s_p$-th cyclically shifted sequence from the root index $r_p$ of Zadoff-Chu code sequence, $N_{RP}$ represents the length of the RP codes per OFDMA symbol, $N_{TCS}$ represents the unit of time domain cyclical shift per OFDMA symbol, and $N_{FFT}$ represents the Fast Fourier Transform (FFT) size. For the case where $N_{RP}$ equals to 72, the placement of the symbols in a padded Zadoff-Chu code sequence may be given as shown in FIG. 10, wherein the Zadoff-Chu code sequence with 211 symbols are divided into three sections. The equation is extended from the padded Zadoff-Chu code as follows:

$$x'_p(n, k) = \exp\left(-j \cdot \pi\left(\frac{r_p \cdot (n \cdot 71 + k) \cdot (n \cdot 71 + k + 1)}{211}\right)\right),$$
where $k = 0, 1, \ldots, N_{RP} - 1; n = 0, 1, 2$ According to the equation, $x'_p(0,71)$ is the same as $x'_p(1,0)$, $x'_p(1,71)$ is the same as $x'_p(2,0)$, $x'_p(2,69)$ is the same as $x'_p(0,0)$. Therefore, $x_p(0,71)$ is the same as $x_p(1,0)$ with $$\exp\left(-j \cdot \pi\left(\frac{2 \cdot 71 \cdot s_p \cdot N_{TCS}}{N_{FFT}}\right)\right)$$

phase rotation, $x_p(1,71)$ is the same as $x_p(2,0)$ with $$\exp\left(-j \cdot \pi\left(\frac{2 \cdot 71 \cdot s_p \cdot N_{TCS}}{N_{FFT}}\right)\right)$$

phase rotation, and $x_p(2,69)$ is the same as $x_p(0,0)$ with $$\exp\left(-j \cdot \pi\left(\frac{2 \cdot 69 \cdot s_p \cdot N_{TCS}}{N_{FFT}}\right)\right)$$

phase rotation. Note that the residual slots in the end of the padded third section are further padded with the duplication of the second and third symbols of the first section, i.e., the $x_p(0,1)$ and $x_p(0,2)$, according to the same cyclical padding manner.

Figure 11:
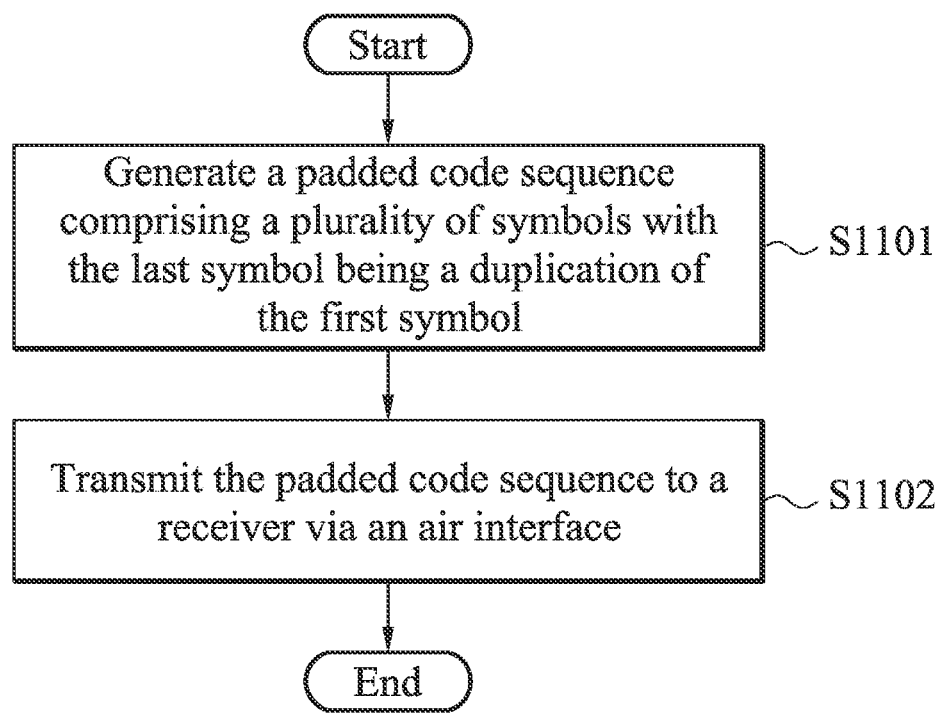
FIG. 11 is a flow chart illustrating a transmission method with code sequence extension according to an embodiment of the invention.

FIG. 11 is a flow chart illustrating a transmission method with code sequence extension according to an embodiment of the invention. The transmission method may be applied in a wireless communication device, such as the transmitter 110, for code sequence transmission to a receiver via the air interface. The wireless communication device and the receiver may be in compliance with the OFDM technology or the SC-OFDM technology. To begin, the wireless communication device generates a padded code sequence comprising a plurality of symbols with the last symbol being a duplication of the first symbol (step S1101). To be more specific, the wireless communication device may first generate an original code sequence. Subsequently, the wireless communication device extends the original code sequence with cyclical padding a duplication of the first symbol to the end of the original code sequence. After generating the padded code sequence, the wireless communication device further transmits the padded code sequence to the receiver via the air interface (step 1102). Thus, the transmission of the code sequence between the wireless communication device and the receiver is achieved successfully. The padded code sequence may be carried out in several embodiments as described above. For example, in the case where the padded code sequence is applied to the ranging channel or the random access channel in an OFDM or a SC-OFDM system, the first symbol of the original code sequence may be duplicated and cyclically padded to the end of the original code sequence, as shown in FIG. 2A, 2B, or 2C, and even more, the padded code sequence may be further duplicated in the time domain, as shown in FIG. 3. Alternatively, the original code sequence may be divided into sections and the first symbol of each section is duplicated and cyclically padded to the end of the previous section, as shown in FIG. 4, and even more, the padded code sequence may be further duplicated on the time domain, as shown in FIG. 5. In another embodiment, for the case where the distributed structure is employed for the ranging channel or the random access channel, the padding rule of the padded code sequence as described above with respect to FIGS. 2A to 2C may be used for each distributed transmission block, as shown in FIG. 6A, or the padding rule as described above with respect to FIG. 4 may be used, as shown in FIG. 6C. Specifically, when multiple original code sequences are provided, the padding rule as described above with respect to FIGS. 2A to 2C may also be used for each original code sequence and the padded original code sequences are aligned on the time domain for each distributed transmission block. Yet in other embodiments, for the case where the padded code sequence is applied to the synchronization channel with multiple antennas, the code sequence may be padded, duplicated, and transmitted using the multiple antennas according to the padding rule as described above with respect to FIGS. 2A to 2C with a respective antenna, as shown in FIG. 9A, or may be divided, padded, and transmitted according to the padding rule as described above with respect to FIG. 4, as shown in FIG. 9B. Note that the code sequence may be a Zadoff-Chu code sequence, a GCL code sequence, or a CAZAC code sequence.

Take the Zadoff-Chu code sequence for an RP code for example. The Zadoff-Chu code sequence is a complex-valued mathematical sequence, and when applied to radio signals, gives rise to an electromagnetic signal of constant amplitude. Specifically, the cyclically padded version of the code sequence as proposed in the invention exhibits a useful property that the symbols therein do not cross-correlate with each other (i.e., each symbol remains orthogonal to one another), so that the radio signals may be recovered at the receiver end. Regarding the detailed description of the cyclically shifting rule for an RP code, references may be made to FIG. 10, where the Zadoff-Chu code sequence for the RP code is divided into sections, and then duplicated and cyclically shifted according to the padding rule as described above with respect to FIG. 4. Note that if there are residual slots in the end of the last section, the residual slots may be padded with the duplication of the symbols following the padding symbol, or may be padded with zero-valued symbols. In other embodiments, the cyclically shifting rule for the RP code may be used as described above with respect to FIGS. 2A to 2C, 3, 5, 6A to 6C, and 9A to 9B.

While the invention has been described by way of example and in terms of preferred embodiment, it is to be understood that the invention is not limited thereto. Those who are skilled in this technology can still make various alterations and modifications without departing from the scope and spirit of this invention. For example, the wireless communication device, such as the transmitter 110, and the receiver may be communicating with each other according to any wireless communication standards adopting the OFDM technology, the SC-OFDM technology, or other evolutionary technologies of the OFDM technology family, including the WLAN, the UWB, the WiMAX, the Wireless Broadband (WiBro), and the LTE, etc. Therefore, the scope of the invention shall be defined and protected by the following claims and their equivalents.

What is claimed is:

1. A transmitter for transmitting signals to a receiver, wherein the transmitter is configured to generate a padded code sequence by duplicating the first symbol of a plurality of symbols and padding the duplicated first symbol to the end of the plurality of symbols, transmit the padded code sequence with the symbols therein respectively corresponding to a plurality of first sub-carriers to the receiver via an air interface using only a first antenna in a time period, and duplicate the padded code sequence and transmit the duplicated padded code sequence with the symbols therein respectively corresponding to a plurality of second sub-carriers to the receiver via the air interface using only a second antenna in the time period.

2. The transmitter of claim 1, wherein the receiver further receives the padded code sequence via the air interface, and performs differential detection on the padded code sequence.

3. The transmitter of claim 1, wherein the plurality of first sub-carriers are selected in a continuously increasing order or a continuously decreasing order from a frequency domain.

4. The transmitter of claim 1, wherein the plurality of first sub-carriers and the plurality of second sub-carriers are selected in a continuously increasing order or a continuously decreasing order from a frequency domain, respectively.

5. The transmitter of claim 1, wherein the padded code sequence is transmitted with the symbols therein corresponding to a plurality of first sub-carriers in a first time period, and the transmitter further duplicates the padded code sequence and transmits the duplicated and padded code sequence with the symbols therein corresponding to the plurality of first sub-carriers in a second time period subsequent to the first time period.

6. The transmitter of claim 5, wherein the plurality of first sub-carriers are selected in a continuously increasing order or a continuously decreasing order from a frequency domain.

7. The transmitter of claim 5, further configured to duplicate the padded code sequence and transmit the duplicated and padded code sequence with the symbols therein corresponding to a plurality of second sub-carriers in the first time period and the second time period.

8. The transmitter of claim 7, wherein the plurality of first sub-carriers and the plurality of second sub-carriers are selected in a continuously increasing order or a continuously decreasing order from a frequency domain.

9. The transmitter of claim 1, further configured to determine a transmission length and divide the padded code sequence into at least two sections according to the transmission length, wherein the last symbol of each of said sections is the duplication of the first symbol in the next section, except that the last symbol of the last section is the duplication of the first symbol of the first section.

10. The transmitter of claim 9, wherein the first section of the padded code sequence is transmitted with the symbols therein corresponding to a plurality of first sub-carriers in a first time period, and the second section of the padded code sequence is transmitted with the symbols therein corresponding to the plurality of first sub-carriers in a second time period subsequent to the first time period.

11. The transmitter of claim 10, further configured to duplicate the first section and the second section of the padded code sequence, and transmit the duplicated first section and second section of the padded code sequence with the symbols therein corresponding to the plurality of first sub-carriers in a third time period subsequent to the second time period and a fourth time period subsequent to the third time period, respectively.

12. The transmitter of claim 10, wherein the plurality of first sub-carriers are selected in a continuously increasing order or a continuously decreasing order from a frequency domain.

13. The transmitter of claim 10, wherein the first section of the padded code sequence is transmitted with the symbols therein respectively corresponding to a plurality of first sub-carriers in a time period, and the second section of the padded code sequence is transmitted with the symbols therein respectively corresponding to a plurality of second sub-carriers in the time period.

14. The transmitter of claim 13, wherein the plurality of first sub-carriers and the plurality of second sub-carriers are selected in a continuously increasing order or a continuously decreasing order from a frequency domain, respectively, the plurality of second sub-carriers are latter than the plurality of first sub-carriers in the frequency domain.

15. The transmitter of claim 14, wherein the first section of the padded code sequence is transmitted using a first antenna, and the second section of the padded code sequence is transmitted using a second antenna.

16. The transmitter of claim 1, wherein the padded code sequence is transmitted in a ranging channel, a random access channel, or a synchronization channel of an Orthogonal Frequency-Division Multiplexing (OFDM) environment or a Synchronous Coherent-OFDM (SC-OFDM) environment.

17. The transmitter of claim 1, wherein the padded code sequence is generated from a Zadoff-Chu code sequence, a Generalized Chirp-Like (GCL) code sequence, or a Constant Amplitude Zero AutoCorrelation (CAZAC) code sequence.

18. An OFDM transmitter for transmitting signals to a receiver, wherein the OFDM transmitter is configured to generate a padded Zadoff-Chu code sequence by duplicating the first symbol of a plurality of symbols and padding the duplicated first symbol to the end of the plurality of symbols, and transmit the padded Zadoff-Chu code sequence to a receiver via an air interface.

19. The OFDM transmitter of claim 18, wherein the receiver further receives the padded Zadoff-Chu code sequence via the air interface and performs differential detection on the padded Zadoff-Chu code sequence.

20. The OFDM transmitter of claim 18, wherein the padded Zadoff-Chu code sequence is transmitted with the symbols therein respectively corresponding to a plurality of first sub-carriers selected in a continuously increasing order from a frequency domain.

21. The OFDM transmitter of claim 20, wherein the padded Zadoff-Chu code sequence is transmitted using a first antenna in a time period, and the OFDM transmitter is further configured to duplicate the padded Zadoff-Chu code sequence and transmit the duplicated and padded Zadoff-Chu code sequence using a second antenna in the time period, such that the symbols therein are respectively corresponding to a plurality of second sub-carriers selected in the continuously increasing order from the frequency domain.

22. The OFDM transmitter of claim 18, wherein the padded Zadoff-Chu code sequence is transmitted in a first time period with the symbols therein corresponding to a plurality of first sub-carriers selected in a continuously increasing order from a frequency domain, and the OFDM transmitter is further configured to duplicate the padded Zadoff-Chu code sequence and transmit the duplicated and padded Zadoff-Chu code sequence in a second time period subsequent to the first time period with the symbols therein corresponding to the plurality of first sub-carriers.

23. The OFDM transmitter of claim 22, further configured to transmit the duplicated and padded Zadoff-Chu code sequence in the first time period and the second time period with the symbols therein corresponding to a plurality of second sub-carriers selected in the continuously increasing order from the frequency domain.

24. The OFDM transmitter of claim 18, further configured to determine a transmission length and divides the padded Zadoff-Chu code sequence into at least two sections according to the transmission length, wherein the last symbol of each of said sections is the duplication of the first symbol in the next section, except that the last symbol of the last section is the duplication of the first symbol of the first section.

25. The OFDM transmitter of claim 24, wherein the first section of the padded Zadoff-Chu code sequence is transmitted in a first time period with the symbols therein corresponding to a plurality of first sub-carriers selected in a continuously increasing order from a frequency domain, and the second section of the padded Zadoff-Chu code sequence is transmitted with the symbols therein corresponding to the plurality of first sub-carriers in a second time period subsequent to the first time period.

26. The OFDM transmitter of claim 25, further configured to duplicate the first section and the second section of the padded Zadoff-Chu code sequence, and transmit the duplicated first section and second section of the padded Zadoff-Chu code sequence with the symbols therein corresponding to the plurality of first sub-carriers in a third time period subsequent to the second time period and a fourth time period subsequent to the third time period, respectively.

27. The OFDM transmitter of claim 24, wherein the first section of the padded Zadoff-Chu code sequence is transmitted with the symbols therein respectively corresponding to a plurality of first sub-carriers selected in a continuously increasing order from a frequency domain in a time period, and the second section of the padded Zadoff-Chu code sequence is transmitted with the symbols therein respectively corresponding to a plurality of second sub-carriers selected in the continuously increasing order from the frequency domain in the time period.

28. The OFDM transmitter of claim 27, wherein the first section of the padded Zadoff-Chu code sequence is transmitted using a first antenna, and the second section of the padded Zadoff-Chu code sequence is transmitted using a second antenna.

29. A transmission method for a wireless communication device, comprising:
generating a padded code sequence by duplicating the first symbol of a plurality of symbols and padding the duplicated first symbol to the end of the plurality of symbols;
transmitting the padded code sequence with the symbols therein respectively corresponding to a plurality of first sub-carriers to a receiver via an air interface using only a first antenna in a time period; and
duplicating the padded code sequence and transmitting the duplicated and padded code sequence with the symbols therein respectively corresponding to a plurality of second sub-carriers to the receiver via the air interface using only a second antenna in the time period.

30. The transmission method of claim 29, wherein the receiver further receives the padded code sequence via the air interface, and performs differential detection on the padded code sequence.

31. The transmission method of claim 29, wherein the plurality of first sub-carriers are selected in a continuously increasing order or a continuously decreasing order from a frequency domain.

32. The transmission method of claim 29, wherein the plurality of first sub-carriers and the plurality of second sub-carriers are selected in a continuously increasing order or a continuously decreasing order from a frequency domain, respectively.

33. The transmission method of claim 29, wherein the padded code sequence is transmitted in a first time period with the symbols therein corresponding to a plurality of first sub-carriers selected in a continuously increasing order or a continuously decreasing order from a frequency domain, and the transmission method further comprises duplicating the padded code sequence and transmitting the duplicated and padded code sequence with the symbols therein corresponding to first radio frequencies in a second time period subsequent to the first time period.

34. The transmission method of claim 33, further comprising duplicating the padded code sequence and transmitting the duplicated and padded code sequence in the first time period and the second time period with the symbols therein corresponding to a plurality of second sub-carriers selected in the continuously increasing order or the continuously decreasing order from the frequency domain.

35. The transmission method of claim 29, further comprising determining a transmission length and dividing the padded code sequence into at least two sections according to the transmission length, wherein the last symbol of each of said sections is the duplication of the first symbol in the next section, except that the last symbol of the last section is the duplication of the first symbol of the first section.

36. The transmission method of claim 35, wherein the first section of the padded code sequence is transmitted in a first time period with the symbols therein corresponding to a plurality of first sub-carriers selected in a continuously increasing order or a continuously decreasing order from a frequency domain, and the second section of the padded code sequence is transmitted in a second time period subsequent to the first time period with the symbols therein corresponding to the plurality of first sub-carriers.

37. The transmission method of claim 36, further comprising duplicating the first section and the second section of the padded code sequence, and transmitting the duplicated first section and the duplicated second section of the padded code sequence with the symbols therein corresponding to the plurality of first sub-carriers in a third time period subsequent to the second time period and a fourth time period subsequent to the third time period, respectively.

38. The transmission method of claim 35, wherein the first section of the padded code sequence is transmitted with the symbols therein respectively corresponding to a plurality of first sub-carriers selected in a continuously increasing order or a continuously decreasing order from a frequency domain in a time period, and the second section of the padded code sequence is transmitted with the symbols therein respectively corresponding to a plurality of second sub-carriers selected in the continuously increasing order or the continuously decreasing order from the frequency domain in the time period.

39. The transmission method of claim 38, wherein the first section of the padded code sequence is transmitted using a first antenna, and the second section of the padded code sequence is transmitted using a second antenna.

40. The transmission method of claim 29, wherein the padded code sequence is transmitted in a ranging channel, a random access channel, or a synchronization channel of an Orthogonal Frequency-Division Multiplexing (OFDM) environment or a Synchronous Coherent-OFDM (SC-OFDM) environment.

41. The transmission method of claim 29, wherein the padded code sequence is generated from a Zadoff-Chu code sequence, a Generalized Chirp-Like (GCL) code sequence, or a Constant Amplitude Zero AutoCorrelation (CAZAC) code sequence.

42. A transmission method for an OFDM wireless communication device, comprising:
generating a padded Zadoff-Chu code sequence by duplicating the first symbol of a plurality of symbols and padding the duplicated first symbol to the end of the plurality of symbols; and
transmitting the padded Zadoff-Chu code sequence to a receiver via an air interface.

43. The transmission method of claim 42, wherein the receiver further receives the padded Zadoff-Chu code sequence via the air interface, and performs differential detection on the padded Zadoff-Chu code sequence.

44. The transmission method of claim 42, wherein the padded Zadoff-Chu code sequence is transmitted with the symbols therein respectively corresponding to a plurality of first sub-carriers selected in a continuously increasing order from a frequency domain.

45. The transmission method of claim 44, wherein the padded Zadoff-Chu code sequence is transmitted using a first antenna in a time period, and the transmission method further comprises duplicating the padded Zadoff-Chu code sequence and transmitting the duplicated and padded Zadoff-Chu code sequence using a second antenna such that the symbols therein are respectively corresponding to a plurality of second sub-carriers selected in the continuously increasing order from the frequency domain in the time period.

46. The transmission method of claim 42, wherein the padded Zadoff-Chu code sequence is transmitted in a first time period with the symbols therein corresponding to a plurality of first sub-carriers selected in a continuously increasing order from a frequency domain, and the transmission method further comprises duplicating the padded Zadoff-Chu code sequence and transmitting the duplicated and padded Zadoff-Chu code sequence in a second time period subsequent to the first time period with the symbols therein corresponding to the plurality of first sub-carriers.

47. The transmission method of claim 46, further comprising transmitting the duplicated and padded Zadoff-Chu code sequence in the first time period and the second time period with the symbols therein corresponding to a plurality of second sub-carriers selected in the continuously increasing order from the frequency domain.

48. The transmission method of claim 42, further comprising determining a transmission length and dividing the padded Zadoff-Chu code sequence into at least two sections according to the transmission length, wherein the last symbol of each of said sections is the duplication of the first symbol in the next section, except that the last symbol of the last section is the duplication of the first symbol of the first section.

49. The transmission method of claim 48, wherein the first section of the padded Zadoff-Chu code sequence is transmitted in a first time period with the symbols therein corresponding to a plurality of first sub-carriers selected in a continuously increasing order from a frequency domain, and the second section of the padded Zadoff-Chu code sequence is transmitted with the symbols therein corresponding to the plurality of first sub-carriers in a second time period subsequent to the first time period.

50. The transmission method of claim 49, further comprising duplicating the first section and the second section of the padded Zadoff-Chu code sequence, and transmitting the duplicated first section and the duplicated second section of the padded Zadoff-Chu code sequence with the symbols therein corresponding to first radio frequencies in a third time period subsequent to the second time period and a fourth time period subsequent to the third time period, respectively.

51. The transmission method of claim 48, wherein the first section of the padded Zadoff-Chu code sequence is transmitted with the symbols therein respectively corresponding to a plurality of first sub-carriers selected in a continuously increasing order from a frequency domain in a time period, and the second section of the padded Zadoff-Chu code sequence is transmitted with the symbols therein respectively corresponding to a plurality of second sub-carriers selected in the continuously increasing order from the frequency domain in the time period.

52. The transmission method of claim 51, wherein the first section of the padded Zadoff-Chu code sequence is transmitted using a first antenna, and the second section of the padded Zadoff-Chu code sequence is transmitted using a second antenna.

53. A non-transitory machine-readable storage medium comprising a computer program, when executed, causes a wireless communication device to perform a transmission method, wherein the transmission method comprises:
generating a padded code sequence by duplicating the first symbol of a plurality of symbols and padding the duplicated first symbol to the end of the plurality of symbols;
transmitting the padded code sequence with the symbols therein respectively corresponding to a plurality of first sub-carriers to a receiver via an air interface using only a first antenna in a time period; and
duplicating the padded code sequence and transmitting the duplicated and padded code sequence with the symbols therein respectively corresponding to a plurality of second sub-carriers to the receiver via the air interface using only a second antenna in the time period.

54. The non-transitory machine-readable storage medium of claim 53, wherein the receiver further receives the padded code sequence via the air interface, and performs differential detection on the padded code sequence.

55. The non-transitory machine-readable storage medium of claim 53, wherein the plurality of first sub-carriers are selected in a continuously increasing order or a continuously decreasing order from a frequency domain.

56. The non-transitory machine-readable storage medium of claim 53, wherein the plurality of first sub-carriers and the plurality of second sub-carriers are selected in a continuously increasing order or a continuously decreasing order from a frequency domain.

57. The non-transitory machine-readable storage medium of claim 53, wherein the padded code sequence is transmitted in a first time period with the symbols therein corresponding to a plurality of first sub-carriers selected in a continuously increasing order or a continuously decreasing order from a frequency domain, and the transmission method further comprises duplicating the padded code sequence and transmitting the duplicated and padded code sequence with the symbols therein corresponding to the plurality of first sub-carriers in a second time period subsequent to the first time period.

58. The non-transitory machine-readable storage medium of claim 57, wherein the transmission method further comprises duplicating the padded code sequence and transmitting the duplicated and padded code sequence in the first time period and the second time period with the symbols therein corresponding to a plurality of second sub-carriers selected in the continuously increasing order or the continuously decreasing order from the frequency domain.

59. The non-transitory machine-readable storage medium of claim 53, wherein the transmission method further comprises determining a transmission length and dividing the padded code sequence into at least two sections according to the transmission length, wherein the last symbol of each of said sections is the duplication of the first symbol in the next section, except that the last symbol of the last section is the duplication of the first symbol of the first section.

60. The non-transitory machine-readable storage medium of claim 59, wherein the first section of the padded code sequence is transmitted in a first time period with the symbols therein corresponding to a plurality of first sub-carriers selected in a continuously increasing order or a continuously decreasing order from a frequency domain, and the second section of the padded code sequence is transmitted in a second time period subsequent to the first time period with the symbols therein corresponding to the plurality of first sub-carriers.

61. The non-transitory machine-readable storage medium of claim 60, wherein the transmission method further comprises duplicating the first section and the second section of the padded code sequence, and transmitting the duplicated first section and the duplicated second section of the padded code sequence with the symbols therein corresponding to the plurality of first sub-carriers in a third time period subsequent to the second time period and a fourth time period subsequent to the third time period, respectively.

62. The non-transitory machine-readable storage medium of claim 59, wherein the first section of the padded code sequence is transmitted with the symbols therein respectively corresponding to a plurality of first sub-carriers selected in a continuously increasing order or a continuously decreasing order from a frequency domain in a time period, the second section of the padded code sequence is transmitted with the symbols therein respectively corresponding to a plurality of second sub-carriers selected in the continuously increasing order or the continuously decreasing order from the frequency domain in the time period, and the plurality of second sub-carriers are latter than the plurality of first sub-carriers in the frequency domain.

63. The non-transitory machine-readable storage medium of claim 62, wherein the first section of the padded code sequence is transmitted using a first antenna, and the second section of the padded code sequence is transmitted using a second antenna.

64. The non-transitory machine-readable storage medium of claim 53, wherein the padded code sequence is transmitted in a ranging channel, a random access channel, or a synchronization channel of an Orthogonal Frequency-Division Multiplexing (OFDM) environment or a Synchronous Coherent-OFDM (SC-OFDM) environment.

65. The non-transitory machine-readable storage medium of claim 53, wherein the padded code sequence is generated from a Zadoff-Chu code sequence, a Generalized Chirp-Like (GCL) code sequence, or a Constant Amplitude Zero Auto-Correlation (CAZAC) code sequence.

66. A non-transitory machine-readable storage medium comprising a computer program, when executed, causes an OFDM wireless communication device to perform a transmission method, wherein the transmission method comprises:
generating a padded Zadoff-Chu code sequence by duplicating the first symbol of a plurality of symbols and padding the duplicated first symbol to the end of the plurality of symbols; and
transmitting the padded Zadoff-Chu code sequence to a receiver via an air interface.

67. The non-transitory machine-readable storage medium of claim 66, wherein the receiver further receives the padded Zadoff-Chu code sequence via the air interface, and performs differential detection on the padded Zadoff-Chu code sequence.

68. The non-transitory machine-readable storage medium of claim 66, wherein the padded Zadoff-Chu code sequence is transmitted with the symbols therein respectively corresponding to a plurality of first sub-carriers selected in a continuously increasing order from a frequency domain.

69. The non-transitory machine-readable storage medium of claim 68, wherein the padded Zadoff-Chu code sequence is transmitted using a first antenna in a time period, and the transmission method further comprises duplicating the padded Zadoff-Chu code sequence and transmitting the duplicated and padded Zadoff-Chu code sequence using a second antenna such that the symbols therein are respectively corresponding to a plurality of second sub-carriers selected in the continuously increasing order from the frequency domain in the time period.

70. The non-transitory machine-readable storage medium of claim 66, wherein the padded Zadoff-Chu code sequence is transmitted in a first time period with the symbols therein corresponding to a plurality of first sub-carriers selected in a continuously increasing order from a frequency domain, and the transmission method further comprises duplicating the padded Zadoff-Chu code sequence and transmitting the duplicated and padded Zadoff-Chu code sequence in a second time period subsequent to the first time period with the symbols therein corresponding to the plurality of first sub-carriers.

71. The non-transitory machine-readable storage medium of claim 70, wherein the transmission method further comprises transmitting the duplicated and padded Zadoff-Chu code sequence in the first time period and the second time period with the symbols therein corresponding to a plurality of second sub-carriers selected in the continuously increasing order from the frequency domain.

72. The non-transitory machine-readable storage medium of claim 66, wherein the transmission method further comprises determining a transmission length and dividing the padded Zadoff-Chu code sequence into at least two sections according to the transmission length, wherein the last symbol of each of said sections is the duplication of the first symbol in the next section, except that the last symbol of the last section is the duplication of the first symbol of the first section.

73. The non-transitory machine-readable storage medium of claim 72, wherein the first section of the padded Zadoff-Chu code sequence is transmitted in a first time period with the symbols therein corresponding to a plurality of first sub-carriers selected in a continuously increasing order from a frequency domain, and the second section of the padded Zadoff-Chu code sequence is transmitted with the symbols therein corresponding to the plurality of first sub-carriers in a second time period subsequent to the first time period.

74. The non-transitory machine-readable storage medium of claim 73, wherein the transmission method further comprises duplicating the first section and the second section of the padded Zadoff-Chu code sequence, and transmitting the duplicated first section and the duplicated second section of the padded Zadoff-Chu code sequence with the symbols therein corresponding to the plurality of first sub-carriers in a third time period subsequent to the second time period and a fourth time period subsequent to the third time period, respectively.

75. The non-transitory machine-readable storage medium of claim 72, wherein the first section of the padded Zadoff-Chu code sequence is transmitted with the symbols therein respectively corresponding to a plurality of first sub-carriers selected in a continuously increasing order from a frequency domain in a time period, the second section of the padded Zadoff-Chu code sequence is transmitted with the symbols therein respectively corresponding to a plurality of second sub-carriers selected in the continuously increasing order from the frequency domain in the time period, and the plurality of second sub-carriers are latter than the plurality of first sub-carriers in the frequency domain.

76. The non-transitory machine-readable storage medium of claim 75, wherein the first section of the padded Zadoff-Chu code sequence is transmitted using a first antenna, and the second section of the padded Zadoff-Chu code sequence is transmitted using a second antenna.

* * * * *